United States Patent
Matsusue et al.

(10) Patent No.: US 9,063,265 B2
(45) Date of Patent: Jun. 23, 2015

(54) LENS CAP FOR OPTICAL MODULE, OPTICAL MODULE, AND METHOD FOR MANUFACTURING LENS CAP FOR OPTICAL MODULE

(71) Applicant: Mitsubishi Electric Corporation, Tokyo (JP)

(72) Inventors: Akihiro Matsusue, Tokyo (JP); Koichi Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/297,693

(22) Filed: Jun. 6, 2014

(65) Prior Publication Data

US 2015/0077871 A1   Mar. 19, 2015

(30) Foreign Application Priority Data

Sep. 19, 2013 (JP) ................................ 2013-194523

(51) Int. Cl.
G02B 7/02 (2006.01)
G02B 7/00 (2006.01)
C03C 27/02 (2006.01)
C03B 23/00 (2006.01)

(52) U.S. Cl.
CPC ............... *G02B 7/008* (2013.01); *C03C 27/02* (2013.01); *C03B 23/0013* (2013.01); *G02B 7/028* (2013.01)

(58) Field of Classification Search
CPC ............................... G02B 7/008; G02B 7/028
USPC .................................. 359/811, 819, 820, 827
See application file for complete search history.

(56) References Cited

U.S. PATENT DOCUMENTS 5,379,155 A * 1/1995 Goetschmann et al. ...... 359/820

FOREIGN PATENT DOCUMENTS

| JP | 2-156587 A | 6/1990 |
|---|---|---|
| JP | 2002-296530 A | 10/2002 |
| JP | 2009-37055 A | 2/2009 |

* cited by examiner

*Primary Examiner* — William Choi
(74) *Attorney, Agent, or Firm* — Leydig, Voit & Mayer, Ltd.

(57) ABSTRACT

A lens cap for an optical module includes: a barrel of a metal material; and a press lens of glass and held in the barrel. The coefficient of linear expansion of the glass is 6 to 8 ppm/K, and the coefficient of linear expansion of the metal material is at least 10 ppm/K at 150° C. to 800° C. and no more than 8 ppm/K at up to 100° C. or below.

6 Claims, 5 Drawing Sheets

LENS CAP FOR OPTICAL MODULE, OPTICAL MODULE, AND METHOD FOR MANUFACTURING LENS CAP FOR OPTICAL MODULE

BACKGROUND OF THE INVENTION

1. Field of the Invention

The present invention relates to a lens cap for an optical module, an optical module, and a method for manufacturing a lens cap for an optical module.

2. Background Art

Lens caps for an optical module using a conventional press lens use a material such as SUS430 or SF-20T having a coefficient of linear expansion of 10 ppm/K or more for a metal barrel (e.g., see paragraph 0014 of Japanese Patent Laid-Open No. 2009-37055). That is, a material having a greater coefficient of linear expansion than the coefficient of linear expansion of 6 to 8 ppm/K of glass is used for the barrel. This difference in the coefficient of linear expansion between the lens glass and the metal barrel causes the metal barrel to tighten the lens in a cooling process after molding of a lens at 600 to 800° C. Thus, it is possible to improve airtightness between the lens and the metal barrel.

SUMMARY OF THE INVENTION

In the lens caps for an optical module using a conventional press lens, since the barrel material has a coefficient of linear expansion of 10 ppm/K or more, the distance from the barrel bottom surface to the lens varies approximately 2 to 5 um due to a temperature variation ($\Delta T$=70K) of the lens cap. This causes a variation in the distance between the lens and the light-emitting point of the optical semiconductor element and also a variation in the converged position of the lens, thus producing a variation in the optical output.

Various methods are used to prevent this variation, for example, a method using a material having a coefficient of linear expansion of approximately 10 ppm/K for the part in which the optical semiconductor element is mounted so that the position of the light-emitting point of the optical semiconductor element follows the variation in the lens position or a method which attaches a lens to the mounting surface of the optical semiconductor element. However, the former method cannot be used for products such as an EML chip in which a chip-mounted part is kept at a constant temperature, and the latter method has a problem that the number of parts increases.

There is a method that changes the barrel material to a material having a smaller coefficient of linear expansion (e.g., Kovar, Fe-42Ni having a coefficient of linear expansion of 8 ppm/K or below) to reduce the amount of heat deformation. However, the problem is that the coefficient of linear expansion becomes equivalent to or less than that of the lens, which causes a force of heat caulking between the metal barrel and the lens to reduce, producing He leakage ($1\times10^{-5}$ Pa·m$^3$/s or above) and deteriorating airtightness. Note that there is also another method whereby a pre-molded press lens is fitted into a metal barrel in which a hole is formed and fixed using low melting point glass, but this method provides poor position accuracy between the lens and the barrel.

In view of the above-described problems, an object of the present invention is to provide a lens cap for an optical module, an optical module, and a method for manufacturing a lens cap for an optical module which can prevent an optical output variation and secure airtightness.

According to the present invention, a lens cap for an optical module includes: a barrel made of a metal material; and a press lens made of glass and held to the barrel, wherein a coefficient of linear expansion of the glass is 6 to 8 ppm/K, and a coefficient of linear expansion of the metal material is 10 ppm/K or above at 150 to 800° C. and 8 ppm/K or less at 100° C. or below.

In the present invention, since the coefficient of linear expansion of the metal material is small at 100° C. or below, it is possible to reduce a lens position variation due to heat deformation of the barrel and prevent an optical output variation. At 150 to 800° C., however, the coefficient of linear expansion of the metal material is greater than that of glass, and it is therefore possible to secure airtightness making full use of the force of heat caulking between the barrel and lens.

Other and further objects, features and advantages of the invention will appear more fully from the following description.

DETAILED DESCRIPTION OF THE PREFERRED EMBODIMENTS

Figure 1:
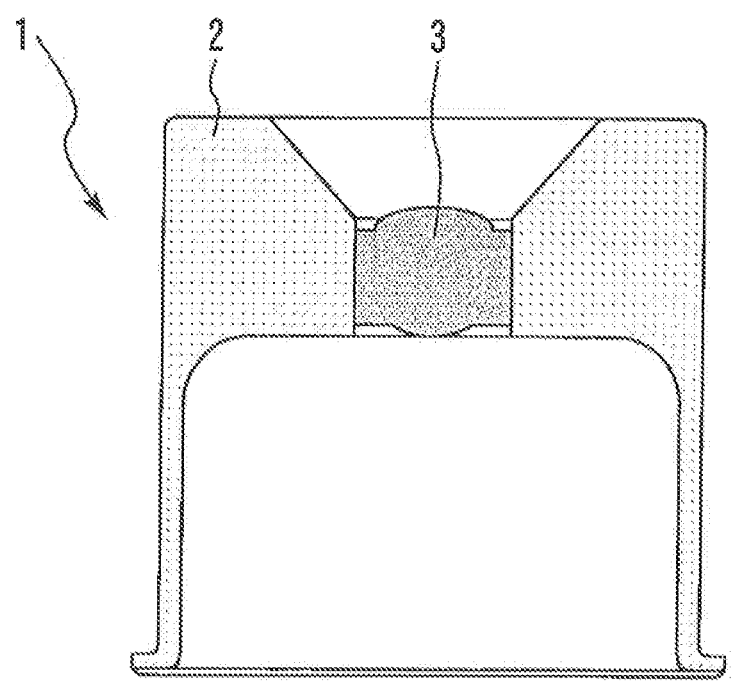
FIG. 1 is a cross-sectional view illustrating an optical module lens cap according to an embodiment of the present invention.

FIG. 1 is a cross-sectional view illustrating an optical module lens cap according to an embodiment of the present invention. An optical module lens cap 1 is provided with a barrel 2 and a press lens 3 held to the barrel 2. The barrel 2 is made of a metal material and the press lens 3 is made of glass. More specifically, the metal material is any one of invar, super invar and stainless steel invar (invar is a registered trademark of Aperam Alloys Imphy).

Figure 2:
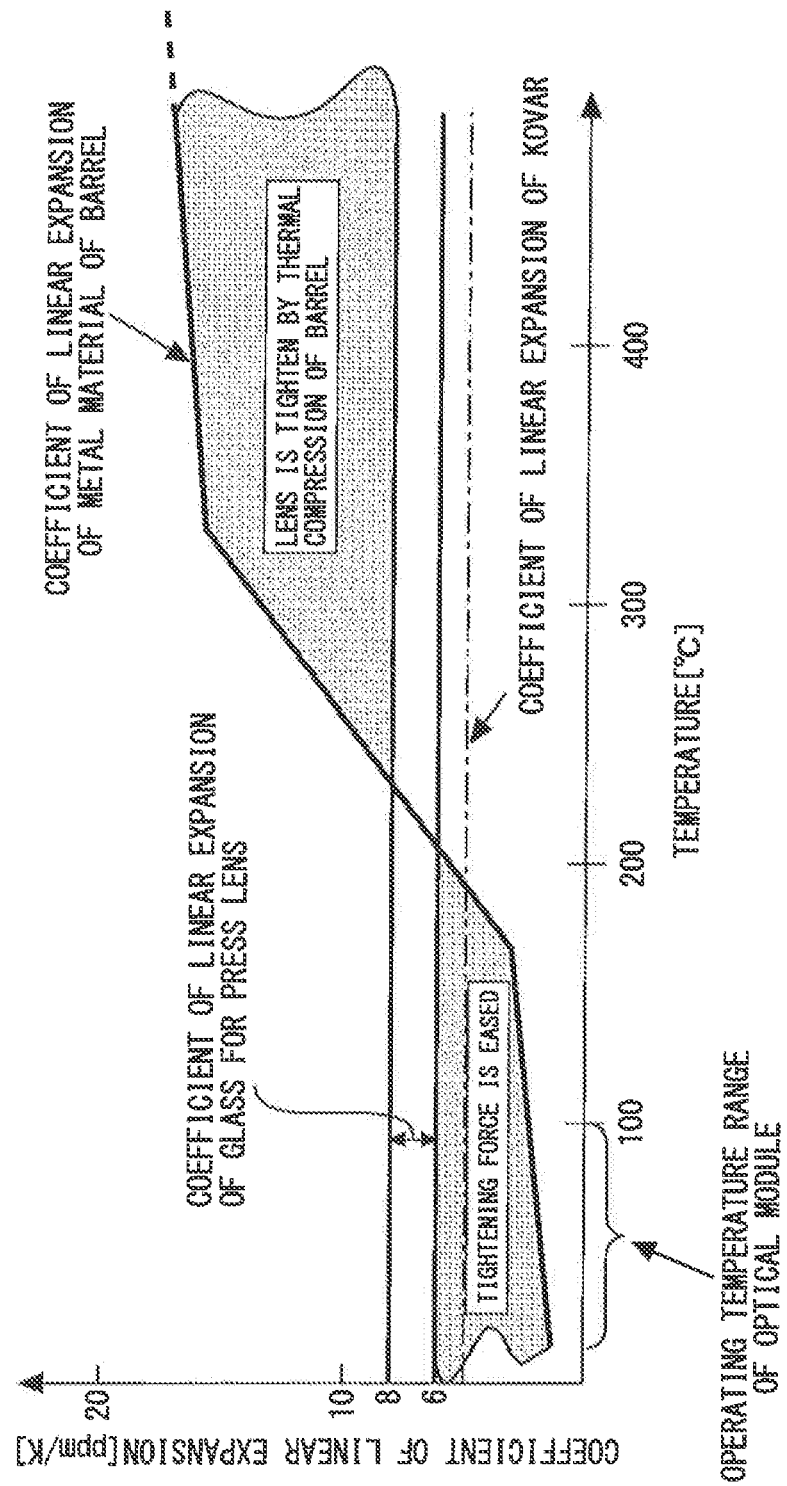
FIG. 2 is a diagram illustrating coefficients of linear expansion of the glass for the press lens and the metal material of the barrel.

FIG. 2 is a diagram illustrating coefficients of linear expansion of the glass for the press lens and the metal material of the barrel. The coefficient of linear expansion of the glass has a relatively small temperature variation of 6 to 8 ppm/K. The coefficient of linear expansion of the metal material is 10 ppm/K or above at 150 to 800° C. (e.g., 10 to 15 ppm/K at 300° C.) and 8 ppm/K or less at 100° C. or below.

A method of manufacturing the above-described optical module lens cap 1 will be described. First, the barrel 2 made of a metal material is formed. Next, glass is molded into the barrel 2 through pressurization to thereby form the press lens 3 held to the barrel 2.

Here, the temperature during the pressurization is 600 to 800° C. Since the coefficient of linear expansion of the barrel 2 is higher at this temperature, heat caulking is performed from the barrel 2 to the press lens 3 in a cooling process after the pressurization. The magnitudes of coefficients of linear expansion of the press lens 3 and the barrel 2 are reversed at 150 to 250° C., but the pressure from the heat caulking so far has been accumulated. For this reason, a sufficient tightening force remains over an operating temperature range of the optical module (140 to 100° C.) and airtightness can be secured.

On the other hand, the coefficient of linear expansion of Kovar is always smaller than that of glass over the entire temperature range and has no glass tightening due to thermal contraction. For this reason, the prior art using a Kovar barrel has a problem of losing airtightness in the optical module lens cap.

Figure 3:
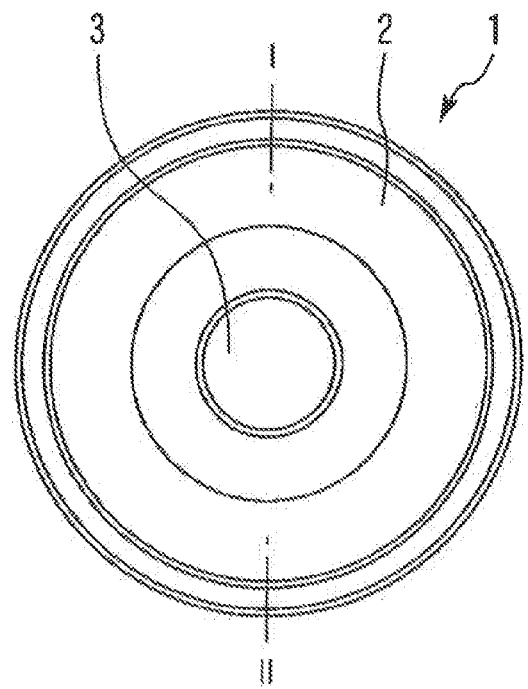
FIG. 3 is a front view illustrating an optical module according to the embodiment of the present invention.
Figure 4:
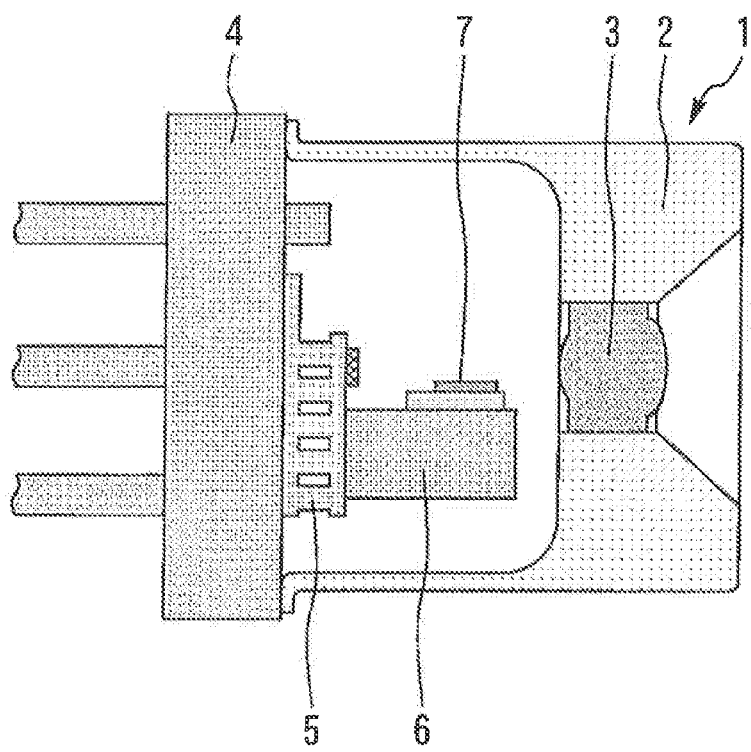
FIG. 4 is a cross-sectional view along a line I-II of FIG. 3.

FIG. 3 is a front view illustrating an optical module according to the embodiment of the present invention. FIG. 4 is a cross-sectional view along a line I-II of FIG. 3. A metal block 6 is provided on a stem 4 via a Peltier module 5. An optical semiconductor element 7 such as a semiconductor laser is provided on the metal block 6. The Peltier module 5 cools the optical semiconductor element 7.

The optical module lens cap 1 is placed so as to cover the optical semiconductor element 7 and then bonded to the stem 4. The optical semiconductor element 7 is placed at a converged position of the press lens 3 in the barrel 2 of the optical module lens cap 1. The inside of the barrel 2 is filled with He.

Figure 5:
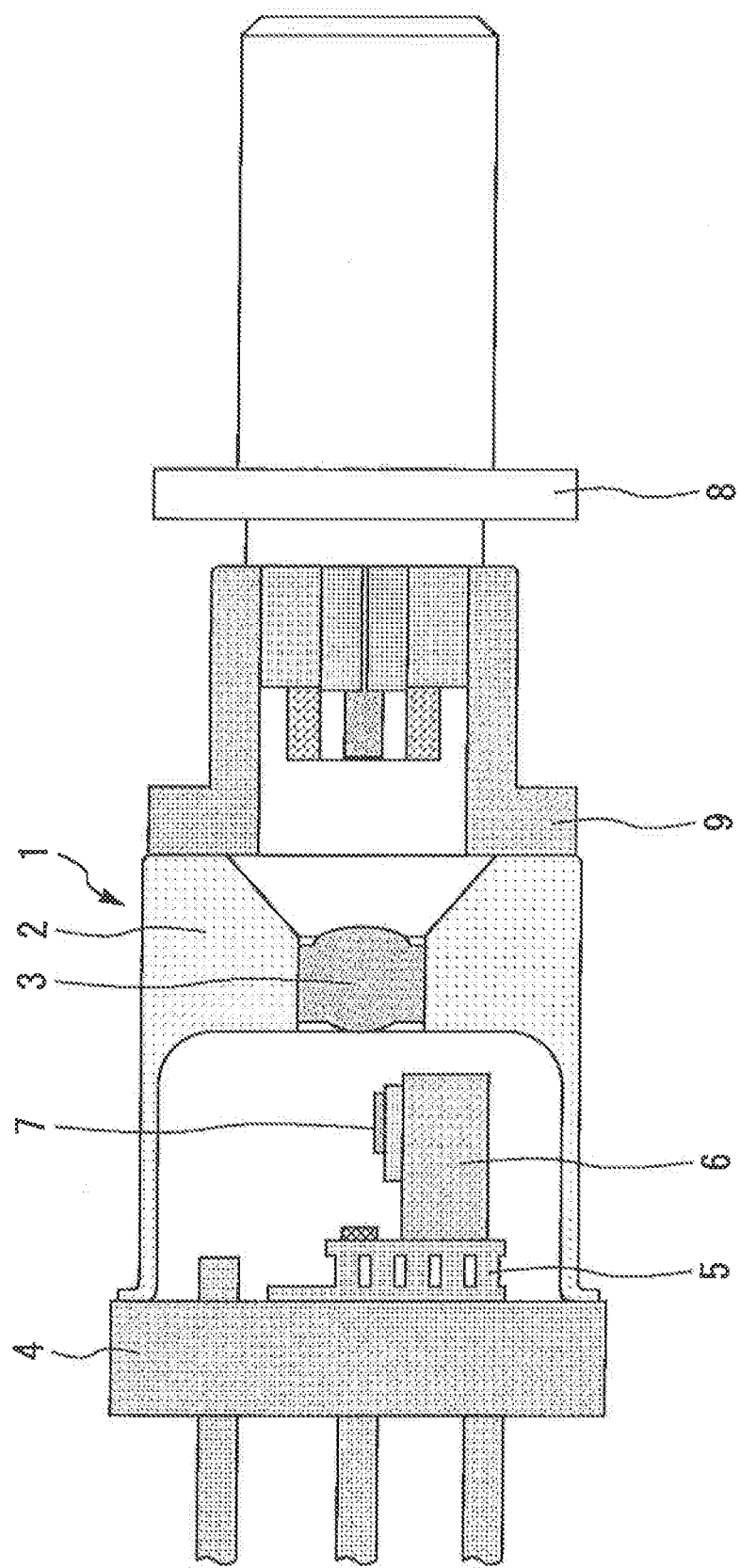
FIG. 5 is a cross-sectional view illustrating the optical module according to the embodiment of the present invention attached to a receptacle.

FIG. 5 is a cross-sectional view illustrating the optical module according to the embodiment of the present invention attached to a receptacle. The optical module is attached to the receptacle 8 via a receptacle holder 9 so that the optical semiconductor element 7 and the optical fiber of the receptacle 8 face each other via the press lens 3.

As described above, according to the present embodiment, the coefficient of linear expansion of the metal material of the barrel 2 is as small as 8 ppm/K or below at 100° C. or below, and it is thereby also possible to reduce a lens position variation caused by a temperature variation of 70K to 1 to 3 um. As a result, it is possible to prevent an optical output variation.

At 150 to 800° C., the coefficient of linear expansion of the metal material is greater than that of glass, and it is thereby possible to secure airtightness inside the optical module lens cap 1 making full use of a force of heat caulking between the barrel 2 and the press lens 3. For this reason, the leakage rate of He from the barrel 2 is $1 \times 10^{-9}$ Pa·m$^3$/s or below.

Note that when the coefficient of linear expansion of glass is excessively large, the amount of contraction of glass increases during cooling from a glass molding temperature to normal temperature, causing a shortage of pressure from heat caulking and reducing airtightness resistance. Thus, the coefficient of linear expansion of glass is preferably not excessively large.

Figure 6:
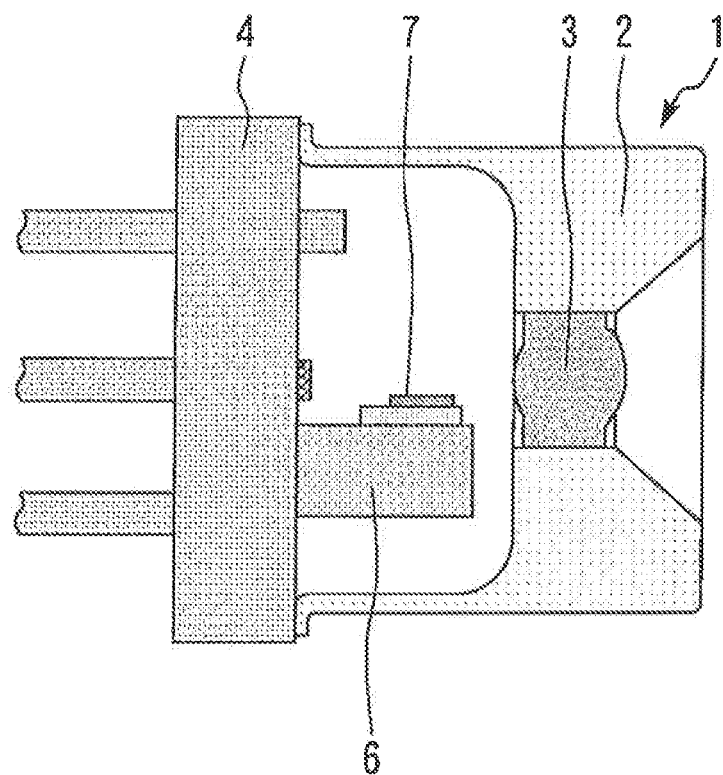
FIG. 6 is a cross-sectional view illustrating a modification of the optical module according to the embodiment of the present invention.

FIG. 6 is a cross-sectional view illustrating a modification of the optical module according to the embodiment of the present invention. The metal block 6 is directly provided on the stem 4. Thus, effects similar to those of the above-described embodiment can be obtained without any Peltier module 5.

Obviously many modifications and variations of the present invention are possible in the light of the above teachings. It is therefore to be understood that within the scope of the appended claims the invention may be practiced otherwise than as specifically described.

The entire disclosure of Japanese Patent Application No. 2013-194523, filed on Sep. 19, 2013 including specification, claims, drawings and summary, on which the Convention priority of the present application is based, is incorporated herein by reference in its entirety.

What is claimed is:

1. A lens cap for an optical module comprising:
    a barrel of a metal material; and
    a press lens of glass and held in the barrel, wherein
        coefficient of linear expansion of the glass is 6 to 8 ppm/K, and
        coefficient of linear expansion of the metal material is at least 10 ppm/K at 150° C. to 800° C. and no larger than 8 ppm/K at up to 100° C.

2. The lens cap for an optical module according to claim 1, wherein the metal material is selected from the group consisting of invar, super invar, and stainless steel invar.

3. An optical module comprising:
    the lens cap for an optical module according to claim 1; and
    an optical semiconductor element located at a position where the press lens in the barrel converges light.

4. The optical module according to claim 3, further comprising helium filling the barrel, wherein leakage rate of the helium from the barrel is no more than $1 \times 10^{-9}$ Pa·m$^3$/s.

5. A method for manufacturing a lens cap for an optical module comprising:
    forming a barrel of a metal material; and
    molding glass into the barrel, by pressurization to form a press lens held in the barrel, wherein
        coefficient of linear expansion of the glass is 6 to 8 ppm/K, and
        coefficient of linear expansion of the metal material is at least 10 ppm/K at 150° C. to 800° C. and 8 ppm/K at up to 100° C.

6. The method for manufacturing a lens cap for an optical module according to claim 5, wherein, during the pressurization, the temperature is in a range from 600° C. to 800° C.

* * * * *